Oct. 31, 1950   H. H. CLAYTON   2,528,115
DETENT MEANS FOR SWITCHES
Filed Nov. 9, 1949
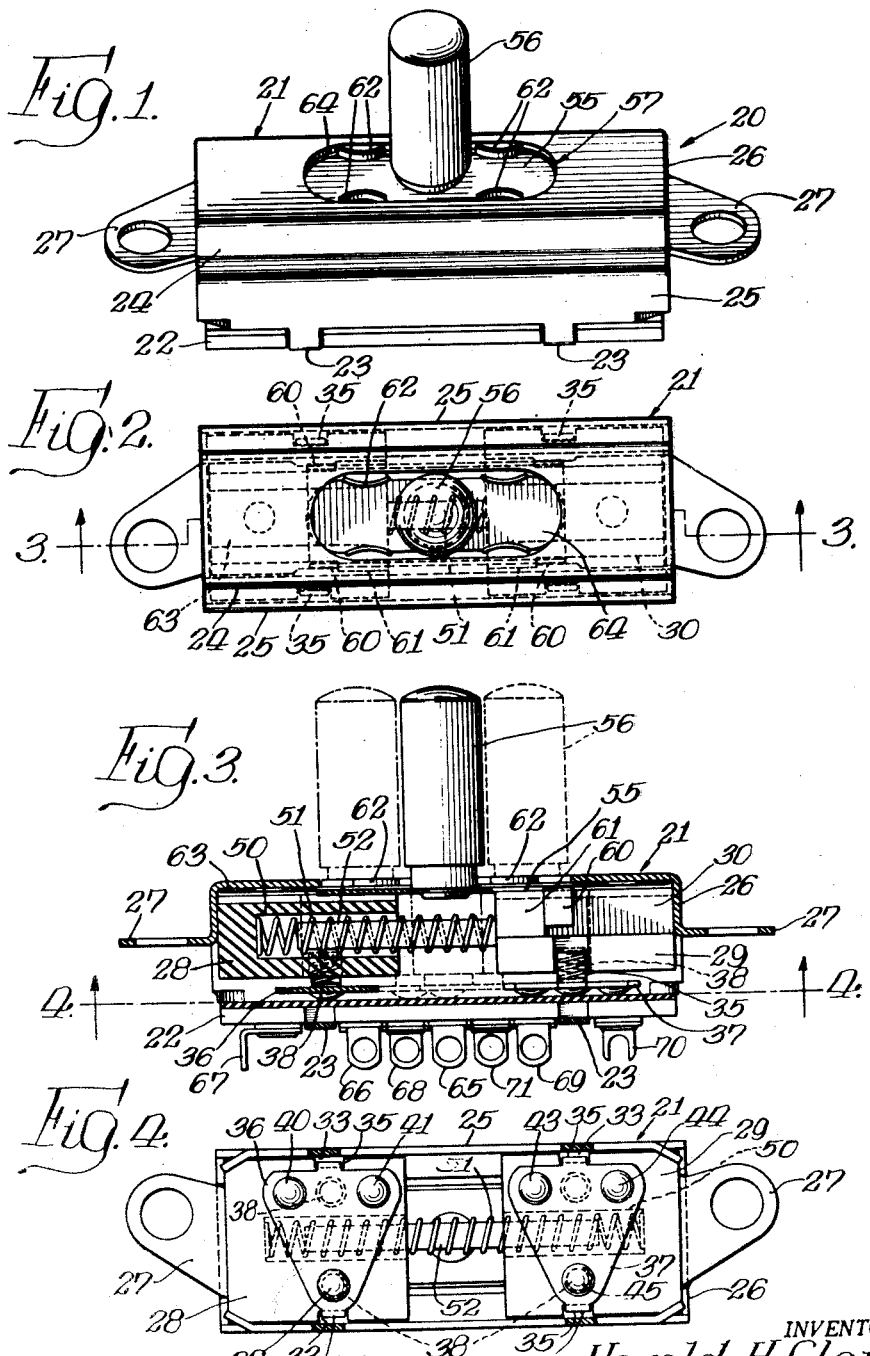
INVENTOR.
Harold H. Clayton,
BY Brown, Jackson,
Boettcher & Dienner Attys.

Patented Oct. 31, 1950

2,528,115

UNITED STATES PATENT OFFICE 2,528,115

DETENT MEANS FOR SWITCHES

Harold H. Clayton, Logansport, Ind., assignor to Essex Wire Corporation, Logansport, Ind., a corporation of Michigan Application November 9, 1949, Serial No. 126,296

7 Claims. (Cl. 200—16)

My present invention is primarily concerned with an improved detent arrangement for selectively arresting the motion of a linearly moving upright post member of the type normally utilized for actuating contact members in a sliding contact switch or the like.

More particularly, my invention is directed to detent means which may be used for positively maintaining the switching post member of a directional turn switch, or the like, in selected circuit closing positions to actuate signal circuits adapted to be utilized for indicating the turning directional movement of an automobile or like motor vehicle.

It has become a common practice among automotive manufacturers to equip automobiles with directional turn indicator mechanisms. Under one such system, presently employed, a sliding type contact switch is used to selectively energize suitable signal circuits to indicate right or left turn of the automobile. Such a switch is disclosed in my prior application entitled, Switch, Serial No. 652,674, filed on March 7, 1946, to which reference is made herein as a preferred type of switch in which my detent device may be effectively utilized. In turn indicator signal systems employing the type of switch displayed in my application of reference above, a turn indicator lever is normally mounted to the steering post of the automobile and adapted to be depressed or elevated to actuate the desired turn indicator signal circuit. Upon depression or elevation of the turn indicator lever a suitable mechanical linkage and arm is actuated to contact a switch actuating post member of a sliding contact type of switch to thereby move the post member to the right or left from a normally unbiased open circuit position for sliding suitable contacts to close a right or left turn signal circuit. Under such a system, as described above, the turn indicator lever and associated linkages normally are required to maintain the switch operating post member in a biased right or left turn position until the turn of the vehicle is completed, thus putting a back load on the actuating linkages which leads to their increased wear and eventual breakdown. I have therefore provided and devised a new and useful detent device, adapted to be used on such a sliding contact style of switch, for maintaining the switch actuating post member in its biased position for indicating right or left turn, or other similar uses, until moved therefrom by an external force such as spring means or returning pressure of a turn indicator linkage system as described above.

It is the primary object of my invention to provide a detent mechanism capable of maintaining a sliding contact type of switch, normally employed to control a plurality of selective circuits, in a biased closed contact switching position until moved from said closed circuit position by the exertion of forces external of the switch and detent means.

It is an important object of my invention to provide an improved detent means for use with a linearly moving actuating post member, whose path of movement the detent means are positioned to interfere with, capable of being resiliently decompressed by said post member to allow rectilinear movement of the post therepast.

It is a further object of my invention to provide a new detent means for use with an automobile turn indicator switch or the like for selectively holding the turn indicator switch in selected turn indicating switching positions, said detent means being incorporated as an integral active part of said switch.

These and further objects will appear from time to time as the following specification and description proceeds. Now in order to acquaint those skilled in this art as to the mode of operation and utilization of my invention, I refer to my prior application, Serial No. 652,674 as an illustrative type of switch in which my detent means may be effectively embodied, reference also being made to the accompanying drawings wherein:

Figure 1 is a perspective view of a switch made in accordance with my invention;

Figure 2 is a top plan view of the switch shown in Figure 1, with some internal parts being shown in hidden position;

Figure 3 is a detailed cross sectional view taken along line 3—3 of Figure 2, with some parts shown in side elevation; and Figure 4 is a horizontal sectional view taken along line 4—4 of Figure 3, looking in the direction indicated by the arrows.

Referring now to the drawings, wherein for clarity of ready cross reference, like parts herein bear the same reference numerals as in my prior application Serial No. 652,674 and wherein it will be seen that I have provided a switch 20 comprising a switch casing formed by a metal housing member 21 in the bottom open end of which a plate member 22 of insulating material is adapted to be secured by a plurality of bent over ears or lug elements 23 formed integrally with the housing member 21 and extending from the open end thereof. The housing 21 is preferably made from sheet steel, which through a suitable forming or stamping operation, is formed with a substantially channel shaped section 24 having lengthwise extending side wall members 25 depending from the side edges thereof. The opposite ends of the channel shaped section 24 are closed by end walls 26 from which suitable integral out-turned flanges or lugs 27 extend to provide mounting means for the switch.

A pair of contact carrying blocks 28 and 29, preferably made of insulating material, are mounted for rectilinear sliding movement lengthwise within the switch housing 21 as will be more clearly seen in Figure 3. Each carrying block is provided with a reduced upper portion 30 adapted to fit in the channel section 24 of the switch housing 21 together with integral extending flange portions 32, the upper surfaces of which are adapted to have guiding engagement with and below the lengthwise extending shoulders positioned at the intersection of the side wall members 25 with the channel shaped section 24. The opposite lateral side edges of the contact carrying block members 28 and 29 may be provided with opposed grooves 33 adapted to receive ears or lugs 35 protruding from a pair of metal contact plate members 36 and 37 associated respectively with the block members 28 and 29.

As seen more clearly in Figures 3 and 4, a pair of small coil springs 38 are arranged between each of the contact carrying blocks 28 and 29 and the contact plates 36 and 37, respectively, for yieldingly urging the contact plate members 36 and 37 into engagement with the upper surface of the insulated plate member 22. It will be observed that the contact plate members 36 and 37 are substantially triangular in plan and that plate member 36 is provided with three contacts 40, 41 and 42 formed by depressing the metal adjacent the corners thereof; the contact plate 37 in like manner also being provided with three contacts 43, 44 and 45.

These several contacts are adapted to have engagement with certain of the contacts in the insulating plate member 22 as will appear more clearly hereinafter. The depressions forming contacts 42 and 45 of the plate members 36 and 37, respectively, each provide for the reception of one of the ends of the coiled springs 38, 38, the other ends of the coiled springs being received in cylindrical inwardly extending recesses 47 formed in the block members 28 and 29.

As will be seen more clearly in Figure 3, the contact carrying block members 28 and 29 are each provided with a cylindrical recess 50 extending inwardly of the opposed inner ends thereof, which recess is provided for the reception of opposite ends of a coiled spring 51. A guide pin 52, herein shown as a solid metal rod, is disposed internally of the coil spring 51 for preventing buckling thereof. In operation the spring 51 normally tends to maintain the contact carrying block members 28 and 29 in the position shown in Figure 3, with the outer ends of the block members in abutting engagement with the closed end portions 26 of the channel shaped section 24 of the switch housing member 21.

An operating member or block carrier means 55 may be mounted for rectilinear movement within the channel shaped section 24 of the switch casing, having a knob member 56 secured intermediate its ends, as by riveting, which knob projects vertically therefrom. The knob member 56 extends through a lengthwise extending slotted aperture 57 formed in the upper end wall of the housing 21. The opposite ends of the carrier member 55 are provided with a pair of ears or lugs 60—60 depending from the side edges thereof, which are adapted to engage shoulders 61 formed integrally with block members 28 and 29 adjacent their opposed inner ends. The depending ears or lugs 60 at each end of the carrying member 55, together with the integral shoulders 61 of each of the contact carrying block members 28 and 29, provide one way, motion transmitting connection means by reason of which either of the contact carrier block members 28 and 29 may be moved rectilinearly and longitudinally within the switch casing by sliding movement of the carrying member.

By virtue of this arrangement of the block carrier 55 and the block members 28 and 29, it will be observed that when the carrier member 55 is moved to the right as by grasping of the knob 56 to move it lengthwise in the slot to the right, the block member 28 by virtue of the engagement of the lugs 60, formed integrally of the member 55, with the shoulder 61 of the block member 28, will be shifted to the right against the force of spring 51. Movement of the carrier member to the right will cause the ear or lug 60 at the right end of the carrier member 55 to slide along the side edges of the block carrier member 29, so that it, and the contact plate 37 remain in the position in Figure 3 of the drawings, with the spring 51 being effective to maintain it in abutting engagement with the adjacent end wall 26 of the channel shaped section 24. Conversely, movement of the carrier member to the left, causes a reverse action to take place, namely, the block member 29 and its associated contact plate 37 are shifted to the left against the force of spring 51 while the block member 28 and its associated contact plate 36 remain in a stationary position in abutting engagement with the adjacent end wall 26 of the channel shaped section 24.

Movement of the knob and carrier members to the right or left of the normal unbiased position causes the knob to contact pairs of protruding curvilinear detents 62 extending inwardly of the slotted aperture 57; the detents 62 being formed as integral members of a thin rectangular metal plate member 63 having a slotted aperture 64 positioned intermediate its ends in conformity and registering relation with the slotted aperture 57 formed in the upper end wall of the housing 21, and adapted to be mounted in adjacent relation therebeneath above the carrier member 55. Engagement of opposed pairs of detents 62 by the knob member 56 causes a resilient depression thereof, to bring about a gripping of the knob to hold the carrier member in the right or left position as the knob is moved past the detents to the end of the slotted apertures 57 and 64. The knob, carrier member and block members will remain in their operating right or left turn positions until released from the projecting detents 62 by a suitable external force such as an operating arm mechanically connected with a conventional turn indicator lever mounted on an automobile steering wheel. The removal of the knob from its right or left position, as dictated by the detents, will normally be effected when the vehicle steering wheel has been turned to a normal straight flight position and the vehicle is no longer undergoing a turning motion.

The bottom plate member 22 of the switch 20 may be provided with a plurality of contacts 65, 66, 67, 68, 69, 70 and 71, suitably secured thereto. The several contacts numbered 65 through 71 are of the rivet type, having their inner ends lying substantially flush with the inner surface of the insulating plate member 22 and riveted over at their outer ends to secure them to plate 22. Riveting of the outer ends of these contacts also serves to secure lead connecting lugs for each of the contacts externally of the plate 22 for purposes of incorporating my directional signal switch in a suitable signal circuit such as is disclosed in my prior application of reference herein, Serial No. 652,674, entitled Switch, so need not be further described herein.

Thus it may be seen that I have disclosed a new and useful directional signal switch having incorporated therein, as an integral operating part thereof, a simple and inexpensive detent for maintaining the switch in circuit operating positions adapted to energize a circuit to signal a right or left turning motion of an automobile or similar vehicle and capable of releasing the switch contacting members from the circuit energizing right or left positions upon the exertion of a small external force on a protruding knob secured to a carrier member actuating the contact carrying blocks.

While I have herein shown and disclosed one form in which my invention may appear, it will be readily understood that substitution of equivalents, numerous modifications, and changes may be made without departing from the spirit and scope thereof, and therefore, I do not wish to be limited to the specific embodiments disclosed herein, except as may appear in the following appended claims.

I claim:

1. Detent means adapted for use with selective circuit switch means or the like, comprising in combination, a plate member having an oblong opening formed therein adapted to receive a post member capable of linear movement along said opening, and a plurality of curvilinear detents on said plate member projecting upwardly and inwardly of the marginal contour of said opening, said detents being positioned in opposing pairs in interfering relation to the path of movement of said post along said opening and adapted to be resiliently compressed by said post.

2. Detent means adapted positively to maintain a switch or the like in open or closed circuit connection, comprising in combination, a rectangular plate having a central oblong opening disposed centrally of its length, said opening being adapted to receive a post member therein for sliding lateral movement therealong, opposed pairs of resilient curvilinear detents disposed along the lengthwise profile of said opening and projecting therein, a vertically extending curvilinear wall positioned along the inner marginal reaches of each of said detents, said post member being adapted to compress said detents in a direction transverse to its path of movement along said opening and said detents being capable of resiliently resuming their normal interfering position with said path of movement of said post member after said member has moved therepast, whereby said detents may hold said post member in selected arrested positions of travel along said opening.

3. Detent means adapted for use in a directional signal switch or the like, comprising a plate having an oval aperture formed therein adapted to receive a switch operating post, said post being adapted to move linearly along said aperture, a plurality of curvilinear detents on said plate projecting inwardly of the marginal limits of said aperture, whereby when said post is moved along said aperture said detents will be resiliently compressed thereby upon exertion of sufficient force to overcome the contacting pressure exerted by said detents, said post being locked in a desired switching position thereby until removed from same by exertion of sufficient force to move said post past said interfering detents.

4. Detent means adapted to maintain a sliding contact type switch or the like in selected open or closed circuit positions, comprising in combination, a rigidly held rectangular plate having a lengthwise opening formed therein, a switch operating post member adapted to be inserted in said opening for sliding lateral movement therealong without engaging the peripheral sides thereof, spring means associated with said post for normally maintaining said post in a neutral open switch position in said lengthwise opening, opposed pairs of detents projecting within the marginal limits of said opening in interfering relation to the path of movement of said post therealong, said detents being rigidly secured to said plate as a contiguous part thereof and adapted to be resiliently compressed by said post in a direction transverse to the path of movement of said post, whereby said post may be maintained in selected positions from its neutral position along said opening by moving said post past said opposing detents which then resiliently resume their normal uncompressed contour to prevent said post from returning to its neutral position until said detents are again compressed thereby.

5. In a switch of the type described, a switch casing comprising a rectangular metal housing having an upper rectangular channel shaped section, operating knob means adapted to extend upwardly through said channel section for sliding linear movement therealong, a rectangular plate member mounted below the upper vertical reaches of said channel section and adapted to receive said knob therethrough for linear sliding movement therealong, and resilient detent means associated with said plate member for resiliently gripping said knob to arrest its sliding movement along said channel section and said plate.

6. The combination in a directional signal switch or the like, comprising a switch casing including a rectangular metal housing having a lengthwise aperture formed along the top portion thereof, a rectangular plate adapted to be inserted below said top of said housing having an aperture formed therein of registering contour with said aperture in said housing top, operating knob means insertable through said two apertures for sliding linear movement therealong, and a plurality of curvilinear detents positioned on said plate extending inwardly of the oblong profile of said two apertures for resiliently gripping said knob movable into interfering engagement therewith.

7. In a directional signal switch or the like, the combination comprising a switch casing having a rectangular metal housing, a top wall of said housing, having a rectangular plan and an oval slotted aperture formed centrally therein, said top wall being of lesser width than said housing and formed contiguously with side walls thereof; said side walls being set inwardly along their upper limits to form an inset shoulder portion running along the length of each side of said housing, a rectangular plate positioned inwardly of said shoulder portions, inside of said casing, adjacent and below said top wall; said plate having an aperture conforming in profile with said top wall aperture and positioned in registering relation therewith, a plurality of curvilinear inwardly extending detents formed integrally of said plate and disposed along opposite marginal limits of said aperture formed therein, said detents being positioned in opposing pairs near each curved end of said apertures; and switch operating knob means, operatively interconnected with suitable switching means disposed within said housing, capable of being shifted laterally along said apertures in said top wall and plate for selectively shifting said switching means across electrical circuit contacts by linear movement thereof, said detents being positioned in interfering relation with the path of movement of said knob whereby said knob will cause resilient compression thereof in moving therepast so that said knob will be maintained in positions on either side of said opposed pairs of detents until moved therefrom by exertion of external force on said knob.

HAROLD H. CLAYTON.

REFERENCES CITED

The following references are of record in the file of this patent:

UNITED STATES PATENTS

| Number | Name | Date |
|---|---|---|
| 1,169,099 | Wilcox et al. | Jan. 18, 1916 |
| 1,942,273 | Bosworth et al. | Jan. 2, 1934 |
| 2,170,736 | Stegmeir | Aug. 22, 1939 |
| 2,185,071 | Alcoran | Dec. 26, 1939 |
| 2,413,135 | Baumgardner | Dec. 24, 1946 |